United States Patent [19]
McCoy

[11] Patent Number: 5,711,709
[45] Date of Patent: Jan. 27, 1998

[54] SELF-ALIGNING ROD END COUPLER

[75] Inventor: Christopher B. McCoy, Alpena, Mich.

[73] Assignee: Douville-Johnston Corporation, Alpena, Mich.

[21] Appl. No.: 612,349

[22] Filed: Mar. 7, 1996

[51] Int. Cl.[6] .................................................. F16D 3/10
[52] U.S. Cl. .............................................. 464/106; 464/147
[58] Field of Search ........................... 464/102, 106, 464/147, 162, 185; 403/386, 388, 389, 390

[56] References Cited

U.S. PATENT DOCUMENTS

| | | | |
|---|---|---|---|
| 1,046,600 | 10/1912 | Kahler | 403/389 X |
| 2,940,786 | 6/1960 | Horning | 464/147 X |
| 5,288,271 | 2/1994 | Nelson et al. | 464/147 X |

OTHER PUBLICATIONS

Magnaloy Coupling Company, "Rod Couplers", Catalog No. REC-9006.

Lin-Act Manufacturing Corp., a Figgie International Company, "Cylinder Systems", Catalog No. A2-1083, Rev. Jan. 1, 1992.

Primary Examiner—John P. Darling
Assistant Examiner—Gregory J. Strimbu
Attorney, Agent, or Firm—Harness, Dickey & Pierce, P.L.C.

[57] ABSTRACT

A self-aligning rod end coupler including an outer housing having a first open end with an internally threaded portion and a second open end having a radially inwardly extending flange. A female adapter is provided having an externally threaded portion for engaging the internally threaded portion of the first open end of the outer housing and an internally threaded portion for engaging an external thread on a rod member. A slide washer is provided having a substantially flat surface disposed against the radially inwardly extending flange in the second open end of the outer housing and having a partial, substantially spherical surface. A male adapter is provided having an externally threaded first end and a second end including a radially outwardly extending portion having a first partial, substantially spherical, concave, surface on a longitudinal end of the male adapter and a second partial, substantially spherical, convex, surface for engaging the partial, substantially spherical surface of the slide washer. A thrust washer is disposed between the male adapter and the female adapter. The thrust washer includes a partial, substantially spherical, convex, surface for engaging the first partial, substantially spherical, concave, surface of the male adapter. The male adapter is both laterally and spherically moveable relative to a central axis of the outer housing.

14 Claims, 2 Drawing Sheets

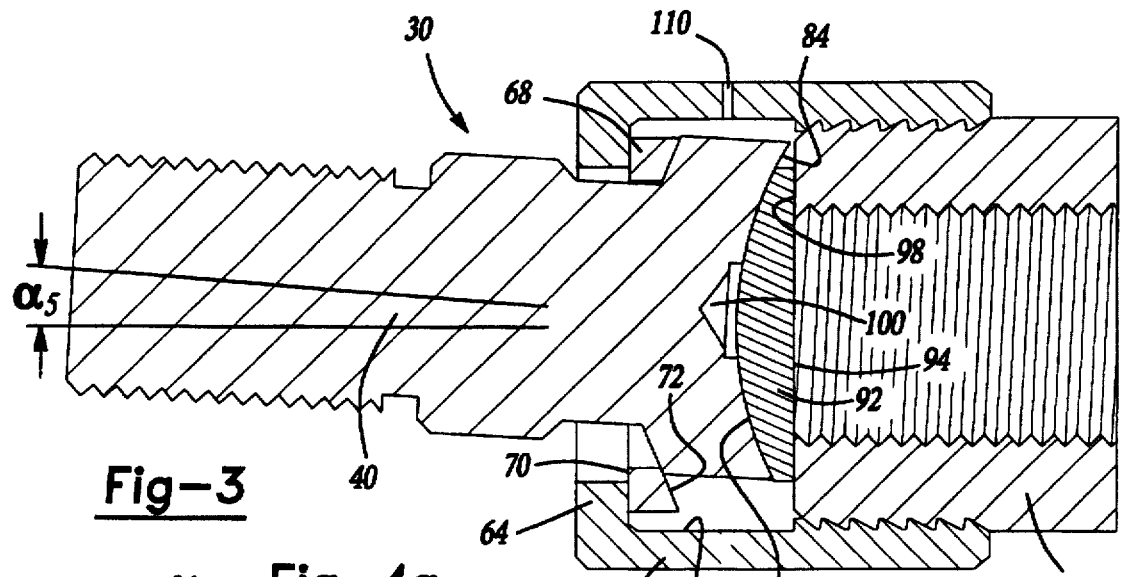
Fig-3
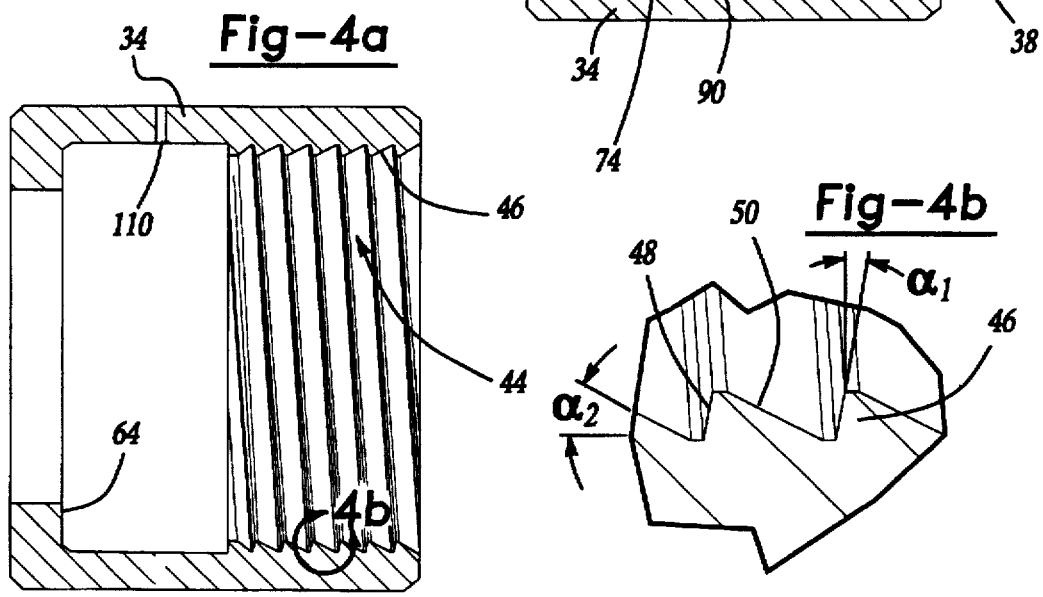
Fig-4a
Fig-4b
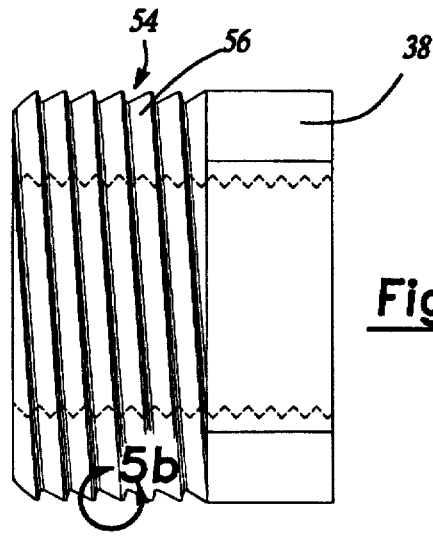
Fig-5a
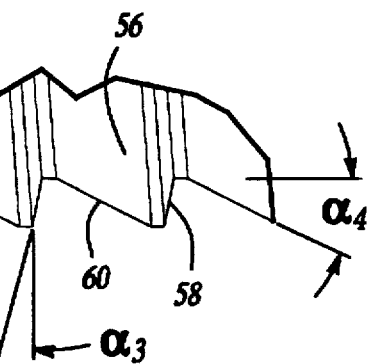
Fig-5b

SELF-ALIGNING ROD END COUPLER

BACKGROUND OF THE INVENTION

1. Field of the Invention

The present invention relates generally to rod end couplers and, more specifically, to a self-aligning rod end coupler capable of both spherical and lateral movement.

2. Description of Background Art

In industry, hydraulic cylinders are commonly used in combination with hydraulic and pneumatic actuating systems. As shown in FIG. 1, a typical hydraulic cylinder 10 includes a cylindrical housing 12 having a retainer plate 14 and a cap member 16 attached to ends thereof. A pair of fluid passages 18 and 20 are provided in the retainer plate 14 and cap member 16, respectively. A piston 22 is provided in the cylinder 12 and is connected to a piston rod end 24 which is supported by a bearing/seal member 26. As the piston 22 is driven by the piston rod end 24 in a longitudinal direction, fluid is driven through fluid passages 18 and 20. The fluid passages 18 and 20 would be connected to suitable fluid delivery lines of a hydraulic or pneumatic system which are well known in the art.

It has been common in the art to connect the piston rod end 24 with an actuating device which includes a rigid rod end. In order to connect a rigid rod end directly to the piston rod end 24, it is generally necessary to almost perfectly align the rigid rod end with the piston rod end 24. Since the variance in the manufacture of the hydraulic and pneumatic machines can vary greatly, self-aligning rod end couplers have been designed in order to accommodate variances in the alignment of the actuator rod end with the piston rod end 24.

One known self-aligning rod end coupler is manufactured by the assignee of the present invention, Magnaloy Coupling Company, a division of the Douville-Johnston Corporation. The self-aligning rod end coupler manufactured by the Magnaloy Coupling Company includes a female adapter member which is received in an outer housing and is allowed to move laterally relative to the outer housing in order to provide lateral tolerance between the actuator rod end and piston rod end 24 of the hydraulic cylinder. In addition, the male adapter is provided with a thrust washer having a partially spherical, convex, surface for mating with an end partially spherical, concave, surface of the male adapter and a fixed securing member which mates with a second partially spherical surface on the male adapter and which guide the male adapter for spherical movement relative to the housing. A problem with the self-aligning rod end coupler manufactured by the Magnaloy Coupling Company is that the design requires that the components of the rod end coupler are sometimes larger in size than is desirable for certain applications.

Accordingly, it is desirable in the art of rod end couplers to provide a rod end coupler that allows substantial lateral and spherical tolerance between the actuator rod end and the piston rod end 24 while also allowing the size of the rod end coupler to be reduced.

Another known linear alignment coupler is manufactured by Lin-Act Manufacturing Corp. The linear alignment coupler manufactured by Lin-Act includes a female adapter having external threads which engage internal threads provided on a housing. A male adapter is provided in a second end of the housing which is provided with a small amount of play therebetween for allowing lateral movement of the male adapter relative to the housing. A thrust washer having a partially spherical, concave, surface is provided between the female adapter and the male adapter. The partially spherical, concave, surface engages a partially spherical, convex, surface on a longitudinal end of the male adapter. In addition, a second washer is provided adjacent to a radially inwardly extending flange in the second end of the housing and is provided with a partially spherical, concave, surface, which mates with a second partially spherical, convex, surface of the male adapter. The first and second partially spherical, concave, surfaces of the first and second thrust washers allows a small (approximately 1°) spherical movement of the male adapter relative to the housing. A problem with the linear alignment coupler manufactured by Lin-Act Manufacturing Corporation is that the limited spherical movement of the male adapter relative to the housing is often less than is desirable.

SUMMARY OF THE INVENTION

Accordingly, it is an object of the present invention to provide a self-aligning rod end coupler which simplifies cylinder installation. The installation of a cylinder which requires connecting a piston rod end with a rigid actuator rod end makes it desirable to have a rod end coupler which is capable of accommodating both lateral and spherical variances in order to accommodate both the actuator rod end and piston rod end.

It is a further object of the present invention to provide a self-aligning rod end coupler which allows for substantial design tolerances. A self-aligning rod end coupler ideally allows both lateral and spherical movement in order to accommodate design tolerances in the other components of the machinery.

It is yet another object of the present invention to provide a self-aligning rod end coupler which increases cylinder life by reducing wear on seals, wipers, bearing surfaces and cushion parts. A rod end coupler which is capable of accommodating rod end misalignment reduces the lateral forces exerted on seals, wipers, bearing surfaces and cushion parts of a cylinder.

It is still another object of the present invention to provide a self-aligning rod end coupler which compensates for machinery deflection and cuts bearing wear from side loads and binding.

It is still another object of the present invention to provide a self-aligning rod end coupler which allows equally effective angular or lateral displacement in either direction, push or pull.

It is yet another object of the present invention to provide a self-aligning rod end coupler which is simple in structure, inexpensive to manufacture, easy to mass produce and durable in use.

These and other objects of the present invention are obtained by providing a self-aligning rod end coupler including an outer housing having a first open end with an internally threaded portion and a second open end having a radially inwardly extending flange. A female adapter is provided having an externally threaded portion for engaging the inwardly threaded portion of the first open end of the outer housing and an internally threaded portion which is adapted to receive a threaded end of a piston rod end. A slide washer is provided having a substantially flat surface disposed against the radially inwardly extending flange in the second open end of the outer housing and having a partial, substantially spherical surface. A male adapter is provided having an externally threaded first end and a second end including a radially outwardly extending portion having a first partial, substantially spherical, concave, surface on a longitudinal end of the male adapter and a second partial, substantially spherical, convex, surface for engaging the partial, substantially spherical surface of the slide washer. A thrust washer is disposed between the male adapter and the female adapter. The thrust washer includes a partial, substantially spherical, convex, surface for engaging the first partial, substantially spherical, concave, surface of the male adapter. The externally threaded portion on the female adapter and the internally threaded portion on the outer housing are buttress threads whose forward face is substantially perpendicular to the screw axis and whose back face is at an angle to the axis, so that the thread is efficient in transmitting power, strong and does not provide a wedge-effect which might crack the outer housing of the rod end coupler. The slide washer is allowed to move laterally relative to a central axis of the outer housing. Likewise, the male adapter is allowed to move laterally relative to the central axis of the outer housing. Furthermore, because the slide washer and thrust washer are capable of lateral movement relative to the outer housing, the male adapter is allowed to move spherically a substantial amount relative to the central axis of the outer housing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein:

FIG. 3 is a cross-sectional view of the self-aligning rod end coupler shown in FIG. 2, with the male adapter illustrated in the extreme misalignment position according to the principles of the present invention;

FIG. 4a is a cross-sectional view of the outer housing of the rod end coupler according to the principles of the present invention;

FIG. 4b is an enlarged view of the buttress thread provided on the internal surface of the outer housing;

FIG. 5a is a plan view of a female adapter according to the principles of the present invention; and FIG. 5b is a detailed view of the buttress thread provided on the external surface of the female adapter.

DETAILED DESCRIPTION OF THE PREFERRED EMBODIMENTS

Figure 2:
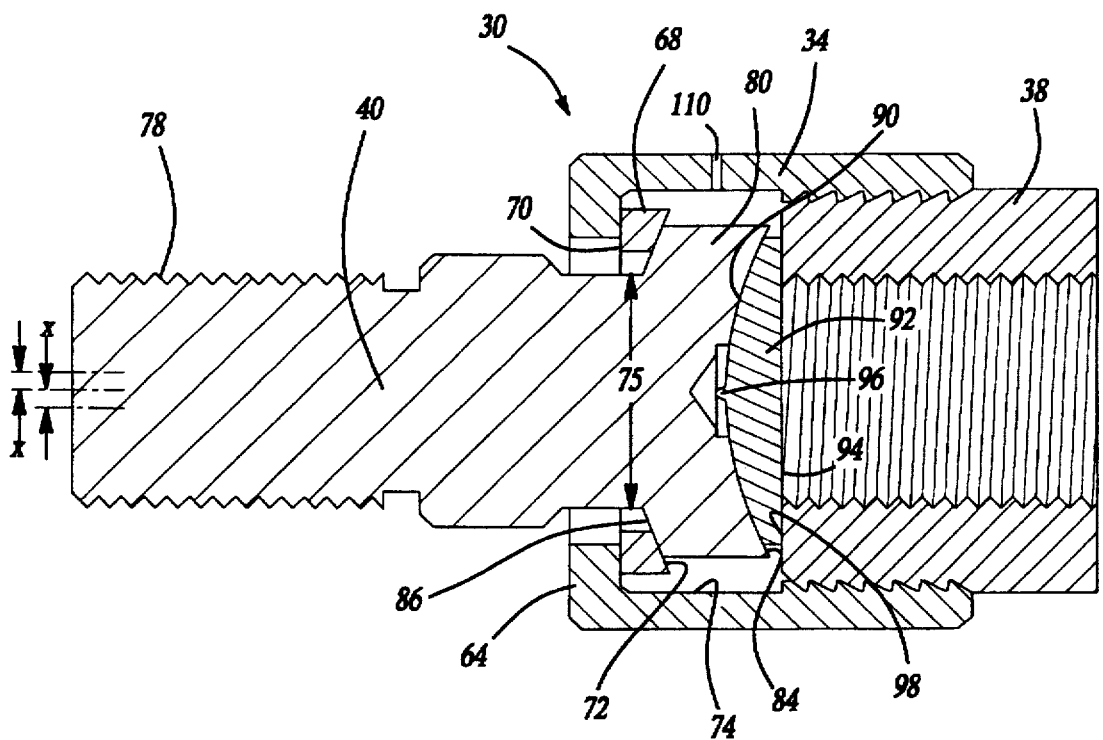
FIG. 2 is a cross-sectional view of a self-aligning rod end coupler according to the principles of the present invention.

The present invention relates to a self-aligning rod end coupler capable of allowing both lateral and spherical tolerances in coupling two rod end members. The self-aligning rod end coupler 30, as shown in FIGS. 2 and 3, includes an outer housing 34 which receives a female adapter 38 and a male adapter 40.

The outer housing 34 includes an internally threaded portion 44 as shown in FIGS. 4a and 4b. The internally threaded portion 44 includes buttress threads 46 having a forward face 48 which is substantially perpendicular to the screw axis and a back face 50 is at an angle to the screw axis, so that the thread is efficient in transmitting power, strong and reduces the wedging effect on the outer housing 34 which may lead to cracking of the outer housing 34. According to a preferred embodiment of the present invention, the forward face 48 of the buttress thread 46 is at an angle $\alpha 1$ of approximately 7.0° from a perpendicular to the screw axis, and the back face 50 of the buttress thread 46 is at an angle $\alpha 2$ of 45° to the screw axis.

As shown in FIGS. 5a and 5b, the female adapter 38 is provided with an external threaded portion 54 which mates with the internally threaded portion 44 of the outer housing 34. The externally threaded portion 54 includes a buttress thread 56 having a forward face 58 which is substantially perpendicular to the screw axis and whose back face 60 is at an angle to the screw axis. According to a preferred embodiment of the present invention, the forward face 58 of the buttress thread 56 is at an angle $\alpha 3$ of 7.0° from the perpendicular to the screw axis and the back face 60 of the buttress thread 56 is at an angle $\alpha 4$ of 45° to the screw axis. The buttress threads 46 and 56 on the outer housing 34 and female adapter 38, respectively, are important to improving the tensile load capacity of the rod end coupler, while allowing the outer housing 34 to be designed with a reduced thickness. The buttress threads 46 and 56 reduce the wedging effect that a standard thread would impose on the outer housing 34 which could lead to cracking of the outer housing 34 if the outer housing were not of sufficient thickness.

The outer housing 34 includes a radially inwardly extending flange 64 in a second end of the outer housing 34. A slide washer 68 is received in the outer housing 34 and is provided with a substantially flat surface 70 which is disposed against the radially inwardly extending flange 64 of the outer housing 34. The slide washer 68 is also provided with a partial, substantially spherical, concave, surface 72 and has an outer diameter which is smaller than the inner diameter of the inner surface 74 of the outer housing 34. Because the outer diameter of the slide washer 68 is smaller than the inner diameter of the inner surface 74 of the outer housing 34, the slide washer 68 is free to slide laterally relative to the central axis of the outer housing 34.

The inner diameter of the slide washer 68 and the relief diameter 75 of the male adapter 40 are sized such that with the male adapter 40 at its full spherical displacement of approximately 3 degrees from the central axis of the outer housing 34, interference is encountered between the relief diameter 75 of the male adapter 40 and the inner diameter of the slide washer 68 to limit its further spherical displacement, but there exists sufficient clearance between the outer diameter of the slide washer 68, the inside surface 74 of the outer housing 34 and the inner diameter of the radially inwardly extending flange 64 of the outer housing 34 to allow the full lateral displacement of the male adapter 40 of approximately 1/16 inch relative to the central axis of the outer housing 34.

Conversely, the outer diameter of the slide washer 68 and the diameter of the inside surface 74 of the outer housing 34 are successively sized such that with the male adapter 40 in its full lateral displacement of approximately 1/16 inch from the central axis of the outer housing 34, interference is encountered between the outer diameter of the slide washer 68 and the inside surface 74 of the outer housing 34 to limit its further lateral displacement, but there exists sufficient clearance between the inner diameter of the slide washer 68, the relief diameter 75 of the male adapter 40 and the inner diameter of the radially inwardly extending flange 64 of the outer housing 34 to allow the full spherical displacement of the male adapter 40 of approximately 3 degrees from the central axis of the outer housing 34.

The male adapter 40 is provided with a first end having an externally threaded rod end coupler portion 78 which is adapted to be received within a threaded portion of an actuator rod end, not shown. The male adapter 40 is also provided with a second end including a radially outwardly extending portion 80 having a first partial, substantially spherical, concave, surface 84 on a longitudinal end of the male adapter 40. A second partial, substantially spherical, convex, surface 86 is provided on the radially outwardly extending portion 80 for engaging the partial, substantially spherical, concave, surface 72 of the slide washer 68. The partial, substantially spherical, concave, surface 84 on the longitudinal end of the male adapter 40 engages a partial, substantially spherical, convex, surface 90 of a thrust washer 92. The thrust washer 92 also includes a substantially flat surface 94 which is disposed against an end surface 98 of female adapter 38. The first partial, substantially spherical, concave surface 84 and the second partial, substantially spherical, convex surface 86 have a substantially common center of curvature. Furthermore, the partial, substantially spherical surface 72 of the slide washer 68 and the partial, substantially spherical, convex surface 90 of thrust washer 92 have a substantially common center of curvature when the rod end coupler is in an assembled condition. The thrust washer 92 has an outside diameter which is smaller than the inside diameter of the inner surface 74 of outer housing 34. Therefore, the thrust washer 92 is capable of sliding laterally relative to a central axis of the outer housing 34. Because the thrust washer 92 and slide washer 68 are capable of lateral movement relative to the central axis of the outer housing 34, the male adapter 40 according to a preferred embodiment of the present invention, is capable of lateral movement x of approximately 1/16 of an inch (See FIG. 2) in any lateral direction for a total range of 1/8 of an inch. In addition, the male adapter is capable of spherical movement α5 (see FIG. 3) relative to the outer housing 34 to approximately 3° from the central axis of the outer housing 34 for a total range of spherical movement of approximately 6°.

The partially spherical concave, surface 84 of the male adapter 40 is provided with a relief portion 100 which accommodates a nipple 96 which is left over from the machining operation on the partially spherical, convex, surface 90 of thrust washer 92. By providing the relief 100 in the male adapter 40 the need to go back and grind the nipple from the thrust washer 92 is eliminated.

Figure 1:
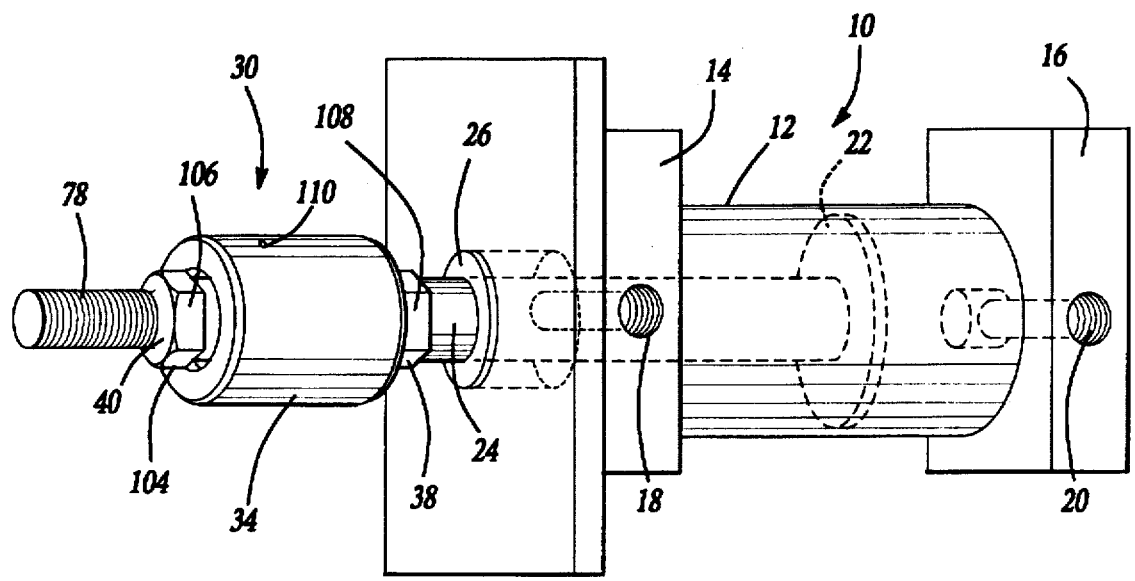
FIG. 1 is a perspective view of a common hydraulic cylinder having a self-aligning rod end coupler according to the principles of the present invention connected thereto.

As shown in FIG. 1, the male adapter 40 is provided with a neck portion 104 having a flat 106 for engagement by a wrench. In addition, the female adapter 38 is also provided with a flat 108 for applying a wrench thereto.

The method of assembling the self-aligning rod end coupler 30 will now be described. First, the slide washer 68 is inserted in the first open end of the outer housing 34 so that the substantially flat surface 70 is disposed against the radially inwardly extending flange 64 of the outer housing 34. A male adapter 40 is then inserted through the first open end of the outer housing and through an opening in the slide washer 68 so that the second partial, substantially spherical, convex, surface 86, of the male adapter 40, engages the partial, substantially spherical, concave, surface 72 of the slide washer 68. The thrust washer 92 is then inserted in the first open end of the outer housing 34 so that the partial, substantially spherical, convex, surface 90 of the thrust washer 92 engages the first partial, substantially spherical, concave, surface 84 of the male adapter 40. Finally, the female adapter 38 is threadedly engaged with the internally threaded portion 44 in the first open end of the outer housing 34. In the preferred assembly, the female adapter 38 is screwed into the outer housing 34 and hand-tightened and then backed off slightly (e.g., 1/4 turn) to permit free movement of the parts. The threads 54 and 44 of the female adapter 38 and outer housing 34 are then glued together (e.g. using LOCTITE) and lubricant is injected into hole 110 provided in the outer housing 34. In addition, in the preferred embodiment of the present invention, a higher tensile strength steel is used. In particular, 4140 grade steel is used for the housing 34 and male adapter 40.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A self-aligning rod end coupler, comprising:

a housing having a first open end and a second open end, said first open end having an internally threaded portion and said second open end having a radially inwardly extending flange;

a female adapter having an externally threaded portion for engaging said internally threaded portion of said first open end of said housing;

a slide washer having a first surface slidably disposed against said radially inwardly extending flange of said second open end of said housing and having a partial, substantially spherical second surface;

a male adapter having a first threaded end and a second end, said second end including a radially outwardly extending portion having a first partial, substantially spherical, concave surface on a longitudinal end of said male adapter and a second partial, substantially spherical, convex surface, said second partial, substantially spherical, convex surface of said second end of said male adapter engaging said partial, substantially spherical second surface of said slide washer; and a thrust washer disposed between said male adapter and said female adapter, said thrust washer having a partial, substantially spherical, convex surface for engaging said first partial, substantially spherical, concave surface of said second end of said male adapter wherein during rotational movement of said male adapter relative to said housing, said male adapter moves relative to said slide washer and said thrust washer.

2. The self-aligning rod end coupler according to claim 1, wherein said externally threaded portion on said female adapter and said internally threaded portion of said housing are buttress threads.

3. The self-aligning rod end coupler according to claim 1, wherein said housing includes a lubricant injection hole.

4. The self-aligning rod end coupler according to claim 1, wherein said first partial, substantially spherical, concave, surface of said second end of said male adapter includes a recessed central portion.

5. The self-aligning rod end coupler according to claim 1, wherein said first partial, substantially spherical, concave surface and said second partial, substantially spherical, convex, surface of said second end of said male adapter have a substantially common center of curvature.

6. The self-aligning rod end coupler according to claim 1, wherein said partial, substantially spherical second surface of said slide washer and said partial, substantially spherical, convex, surface of said thrust washer have a substantially common center of curvature when said self-aligning rod end coupler is in an assembled condition.

7. The self-aligning rod end coupler according to claim 1, wherein said slide washer is allowed to move laterally relative to a central axis of said housing.

8. The self-aligning rod end coupler according to claim 1, wherein said male adapter is allowed to move laterally relative to a central axis of said housing.

9. The self-aligning rod end coupler according to claim 1, wherein said male adapter is allowed to move a total of approximately 6 degrees spherically relative to a central axis of said housing.

10. The self-aligning rod end coupler according to claim 1, wherein said externally threaded portion of said female adapter is glued to said internally threaded portion of said housing.

11. A method of making a self-aligning rod end coupler, comprising the steps of:

provinding a housing having a first open end and a second open end, said first open end having an internally threaded portion and said second open end having a radially inwardly extending flange;

inserting a slide washer in said first open end of said housing, said slide washer having a substantially flat surface and a partial, substantially spherical surface, said substantially flat surface disposed against said radially inwardly extending flange;

inserting a male adapter through said first open end of said housing and through an opening in said slide washer, said male adapter having a first externally threaded end and a second end, said second end including a radially outwardly extending portion having a first partial, substantially spherical, concave, surface on a longitudinal end of said male adapter and a second partial, substantially spherical, convex, surface, said second partial, substantially spherical, convex surface of said second end of said male adapter engaging said partial, substantially spherical surface of said slide washer;

inserting a thrust washer in said first open end of said housing, said thrust washer having a partial, substantially spherical, convex, surface for engaging said first partial, substantially spherical, concave, surface of said second end of said male adapter; and inserting a female adapter in said first open end of said housing, said female adapter having an externally threaded portion for engaging said internally threaded portion of said first open end of said housing wherein during rotational movement of said male adapter relative to said housing, said male adapter moves relative to said slide washer and said thrust washer.

12. The method of making a self-aligning rod end coupler according to claim 11, further comprising the step of gluing said externally threaded portion of said female adapter to said internally threaded portion of said housing.

13. The method of making a self-aligning rod end coupler according to claim 11, further comprising the step of injecting a lubricant into a hole in said housing.

14. The method of making a self-aligning rod end coupler according to claim 11, wherein said externally threaded portion of said female adapter and said internally threaded portion of said housing are buttress threads.

* * * * *